(12) United States Patent
Iyoki et al.

(10) Patent No.: US 7,787,133 B2
(45) Date of Patent: Aug. 31, 2010

(54) OPTICAL DISPLACEMENT-DETECTING MECHANISM AND PROBE MICROSCOPE USING THE SAME

(75) Inventors: Masato Iyoki, Chiba (JP); Hiroyoshi Yamamoto, Chiba (JP); Kazutoshi Watanabe, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 515 days.

(21) Appl. No.: 11/840,549

(22) Filed: Aug. 17, 2007

(65) Prior Publication Data
US 2008/0049223 A1    Feb. 28, 2008

(30) Foreign Application Priority Data
Aug. 22, 2006    (JP) .............................. 2006-225730

(51) Int. Cl.
*G01B 11/14* (2006.01)
(52) U.S. Cl. ..................................... 356/614
(58) Field of Classification Search ................. 356/614; 359/368
See application file for complete search history.

(56) References Cited
U.S. PATENT DOCUMENTS 5,155,370 A * 10/1992 Osawa et al. ................ 250/548
5,675,154 A * 10/1997 Lindsay et al. ......... 250/442.11
5,835,224 A * 11/1998 Hercher ...................... 356/620
6,051,825 A *  4/2000 Lindsay et al. ........... 250/201.3
2002/0038866 A1 *  4/2002 Nakatsu et al. ............... 257/13

FOREIGN PATENT DOCUMENTS
JP            10-104245           4/1998

OTHER PUBLICATIONS

Takeshi Fukuma et al., Development of Low Noise Cantilever Deflection Sensor for Multi Environment Frequency-modulation Atomic Force Microscopy, Review of Scientific Instruments, 76, 053704 (2005).

* cited by examiner

*Primary Examiner*—Kara E Geisel
(74) *Attorney, Agent, or Firm*—Brinks Hofer Gilson & Lione

(57) ABSTRACT

The optical displacement-detecting mechanism has: a light source for irradiating a target for measurement with light; a light source-driving circuit for driving the light source; an optical detector made from a semiconductor for receiving light after the irradiation of the target for measurement by the light source and converting the light into an electric signal thereby to detect an intensity of light; and an amplifier including a current-voltage conversion circuit for performing current-to-voltage conversion on a detection signal of the optical detector with a predetermined amplification factor. In the optical displacement-detecting mechanism, a light source having a spectrum half width of 10 nm or larger is used, whereby the light source can be driven with an output power of 2 mW or larger without generating mode hop noise and optical feedback noise.

13 Claims, 6 Drawing Sheets

OPTICAL DISPLACEMENT-DETECTING MECHANISM AND PROBE MICROSCOPE USING THE SAME

This application claims priority under 35 U.S.C. §119 to Japanese Patent Application No. JP2006-225730 filed Aug. 22, 2006, the entire content of which is hereby incorporated by reference.

BACKGROUND OF THE INVENTION

1. Field of the Invention

The present invention relates to an optical displacement-detecting mechanism used in a scanning probe microscope, a surface topography measuring apparatus with a probe, and the like, which irradiates a target for measurement, e.g. a cantilever for a scanning probe microscope, with light from a light source, and detects the intensity of light after irradiation by use of an optical detector made from a semiconductor thereby to detect the displacement of the measurement target.

2. Description of the Related Art

A scanning probe microscope (SPM: Scanning Probe Microscope) has been known as an apparatus for measurement of a micro-scale area of a sample, e.g. metal, semiconductor, ceramic, resin, polymeric material, biomaterial, and insulating material, and for observation of an asperity image of a sample surface and information about a physical property thereof.

As a SPM, a microscope including a sample holder to put a sample on, and a cantilever with a probe attached on a tip thereof has been known well, in which the probe is brought close to the sample in use. With such scanning probe microscope, a surface topography and various kinds of physical property information are measured by: relatively moving a sample and the probe in a sample plane (X-Y plane) to scan a surface of the sample; and moving the sample or probe in a direction (Z direction) orthogonal to the sample surface while measuring the quantity of displacement of the cantilever with a displacement-detecting mechanism during scan, thereby to control the distance between the sample and probe.

A configuration of a typical, conventional scanning probe microscope is shown in FIG. 7 (see e.g., JP-A-10-104245).

In the scanning probe microscope 201 shown in FIG. 7, a sample 211 is moved finely in a direction (Z direction) perpendicular to a sample plane (X-Y plane) while the sample 211 is scanned in the sample plane by means of a three-axis micro-moving mechanism (scanner) 213. The three-axis micro-moving mechanism is composed of a cylindrical piezoelectric device having a top end with a sample stage 212 to put a sample on and a bottom end fixed on a base 215.

In addition, a cantilever 207 with a probe 209 on the tip thereof is held on an arm 205 of a high rigidity; the arm is attached to a support rod 203 fixed to the base 215. On a lower face of a tip portion of the cantilever 207, the probe 209 is formed protruding downward. Hence, the tip of the probe 209 can be brought close to a surface of the sample 211 by a roughly moving mechanism (not shown) which is operable to move the probe in Z direction.

An optical displacement-detecting mechanism is provided above the cantilever 207, which includes a semiconductor laser (LD) 221 and an optical detector 235 made from a semiconductor and which is termed an optical lever system in general.

Now, the operational principle of an optical displacement-detecting mechanism of the optical lever system will be described in detail. (See e.g. Takeshi Fukuma et al., "*Development of Low Noise Cantilever Deflection Sensor for Multi Environment Frequency-modulation Atomic Force Microscopy*", REVIEW OF SCIENTIFIC INSTRUMENTS, 76, 053704 (2005)).

FIG. 6A is an illustration showing a configuration of an optical displacement-detecting mechanism 200. FIG. 6B is a diagram of an electric circuit connected with an optical detector 235 made from a semiconductor. The optical displacement-detecting mechanism 200 launches a laser beam (incident light 231) from the light source 221, which is placed above the cantilever 207 and composed of a semiconductor laser, while focusing the laser beam on a rear face of the cantilever 207 through a lens 240. The incident light 231 is reflected off the rear face of the cantilever 207. The reflected light 233 impinges on the optical detector 235, which is placed above the cantilever 207 in an oblique direction with respect to the rear face of the cantilever and made from a semiconductor. The optical detector 235 has a light-receiving face divided into two, upper and lower halves (areas A and B), and is arranged so that an incident position where the reflected light 233 impinges on the detector can be detected.

When light impinges on the light-receiving face (the areas A and B) of the optical detector 235, electric currents $i_A$ and $i_B$ are respectively generated there. Behind the light-receiving face, current-voltage conversion circuits 242a and 242b are connected with the light-receiving areas respectively. The current signals $i_A$ and $i_B$ are converted into voltage signals $v_A$ and $v_B$ with amplification factors depending on the feedback resistance values RIV. The voltage signals are input to a differential amplifier circuit 243, which is to be described later.

In the case of the optical displacement-detecting mechanism shown in FIGS. 6A, 6B and 7, when the probe 209 and sample 211 are brought close to each other, an atomic force acts initially. When the probe and sample are brought closer to each other, a contact force acts, causing deflection in the cantilever 207. The deflection of the cantilever 207 shifts a spot 241 on the light-receiving face of the optical detector 235 upward or downward. The differential amplifier circuit 243 detects the difference $v_{A-B}$ of voltage signals from the upper and lower light-receiving face areas A and B, whereby the quantity of deflection of the cantilever 207 can be measured. Usually a band-pass filter 244 is provided downstream of the differential amplifier circuit 243 for the purpose of cutting frequency components outside the band used for measurement thereby to hold down noises. A signal which has gone through the band-pass filter 244 is sent to a Z feedback circuit 251.

The quantity of deflection of the cantilever 207 depends on the distance between the probe 209 and a surface of the sample 211. Therefore, an asperity image of a sample surface can be obtained by: detecting the quantity of deflection of the cantilever 207 in the form of an output voltage $v_{A-B}$ of the optical detector 235; inputting the quantity of deflection to the Z feedback circuit 251; controlling the distance between the probe 209 and the surface of the sample 211 by means of the Z micro-moving mechanism 213 so that the quantity of deflection is made constant, i.e. the output voltage $V_{A-B}$ is made constant; and using an XY scanner 213 to scan the sample. The control is performed by the control section 257. The three-axis micro-moving mechanism 213 is driven by the XYZ scanner driver 253. An asperity image thus obtained is displayed by a display section 255.

As for the optical displacement-detecting mechanism, the resolution of measured data in a direction of the height of a sample is determined by the detection sensitivity of the displacement-detecting mechanism (i.e. the quantity of an output voltage per unit length) and the intensities of noise components mixing in a signal from the optical displacement-detecting mechanism.

There are some contributing factors to noises in the optical displacement-detecting mechanism (see supra "*Development of Low Noise Cantilever Deflection Sensor for Multi Environment Frequency-modulation Atomic Force Microscopy*"). The factors are as follows.

1. Shot noise coming from the optical detector
2. Johnson noise (thermal noise) coming from the optical detector
3. Quantum-mechanical noise coming from the light source
4. Optical feedback noise and Mode hop noise caused by the light source
5. Thermal fluctuation of the cantilever
6. Interference noise of light Among the factors, what contributes to noises in the optical displacement-detecting mechanism at the highest degree of dependence in a frequency band used by a typical scanning probe microscope is the shot noise attributed to the optical detector of the first noise factor described above. The percentage of the shot noise affecting the detection sensitivity becomes smaller in inverse proportion to the square root of a light quantity P in the light-receiving face.

As a frequency at which the measurement is performed is shifted to a higher region, the degree of dependence on Johnson noise of the second noise factor described above increases. The percentage of the Johnson noise affecting the detection sensitivity becomes smaller in inverse proportion to the light quantity P in the light-receiving face.

The light quantity P in the light-receiving face is given by $P=\alpha P_0$, where $P_0$ represents an output of the light source, a represents a light transmission efficiency of an optical path from the light source to the optical detector through a target for measurement.

As described above, with the shot noise and Johnson noise, when the intensity of light, i.e. light quantity P, in the light-receiving face of the optical detector increases, the quantity of noise with respect to the detection sensitivity decreases, and thus the resolution of measured data is enhanced. In other words, for the purpose of decreasing the percentage of noise with respect to the detection sensitivity, it is useful to increase the output $P_0$ of the light source or to increase the transmission efficiency of the optical path.

Now, light source noises of a semiconductor laser, which is a light source used in a conventional optical displacement-detecting mechanism most commonly, will be examined. In a semiconductor laser, the percentage of the spontaneously emitted light increases inside the device in a low-power region, and thus the noise which is termed quantum-mechanical noise of the third noise factor described above is generated. The percentage of induced emission light becomes dominant with an increase in the laser power, whereby the percentage of quantum-mechanical noise is reduced. As for a semiconductor laser, the larger the output is, the smaller the quantum-mechanical noise is, whereas in the case of driving the laser with a high power, the optical feedback noise which is caused by light reflected by a cantilever, a sample, an optical device placed on the optical path and the like and fed back to the semiconductor laser, and mode hop noise which is generated when the temperature or power of the laser varies are developed as described above in the fourth noise factor. Hence, the light source has an optimal value in its output. Therefore, a semiconductor laser has been driven with a power of 2 mW or smaller in the art. As described above, it is required for reduction in the level of quantum-mechanical noise of an optical detector to increase the output of the light source. However, the output of the light source is restricted by suppressing the generation of optical feedback noise and mode hop noise on the side of the light source.

In addition, to reduce the mode hop noise and optical feedback noise, it is effective to lower the coherency of the light source. In other words, it is preferable to use a light source having a wide spectrum width in a portion where the maximum intensity arises in the intensity spectrum vs. wavelength of the light source. For this purpose, a semiconductor laser has been modulated with a high frequency.

Further, for the purpose of reducing the mode hop noise and optical feedback noise, the measure of using an optical system that the polarization states of incident light and reflected light are changed thereby to avoid the feedback of the reflected light to the semiconductor laser has been taken to prevent optical feedback caused by a target for measurement, a member on the optical path and the like.

Semiconductor lasers have a high coherency and are a light source superior in coherence. Therefore, with regard to e.g. a scanning probe microscope, in some cases interference of the light reflected by a cantilever with the light which has bulged out of the range of the cantilever and undergone reflection by a sample causes the interference noise in an asperity image and data obtained when a physical property with respect to the distance between the probe and a sample is measured as described above in the sixth noise factor.

However, even when high frequency modulation and light polarization by an optical system are utilized, the mode hop noise and optical feedback noise cannot be held down perfectly. Hence, in the art the output of a semiconductor laser has been made 2 mW or smaller, whereby a light source has been driven in a region where the mode hop noise and optical feedback noise are hard to cause.

To make use of the high frequency modulation and polarization optical system, it is required to prepare a special circuit and a special optical device, which makes the apparatus more complicated and increases the cost.

SUMMARY OF THE INVENTION

Therefore, the invention aims at providing an optical displacement-detecting mechanism used in a scanning probe microscope, etc. in a more simplified form in comparison to conventional one, whose noise percentage with respect to the detection sensitivity is reduced.

Further, to hold down the noise percentage with respect to the detection sensitivity, it is required to increase the quantity of incident light on the optical detector. For that purpose, it is necessary to raise the light transmission efficiency a in the course from a light source to an optical detector through a target for measurement. Therefore, the invention aims at providing an optical displacement-detecting mechanism that the quantity of light incident on a light-receiving face of an optical detector is increased by raising the transmission efficiency of light from a light source, whereby the noise percentage with respect to the detection sensitivity is reduced.

To solve the above-described problems, an optical displacement-detecting mechanism in accordance with the invention is configured as follows.

The optical displacement-detecting mechanism includes: a light source for irradiating a target for measurement with light; a light source-driving circuit for driving the light source; an optical detector made from a semiconductor for receiving light after the irradiation of the target for measurement by the light source and converting the light into an electric signal thereby to detect an intensity of light; and a current-voltage conversion circuit for performing current-to-voltage conversion on a detection signal of the optical detector with a predetermined amplification factor. In the optical displacement-detecting mechanism is used a light source that when intensity spectra are measured for the wavelength of the light source, a half width of the spectrum having a maximum intensity is not less than 10 nm and preferably not more than 25 nm. In addition, the light source is driven with an output power of not less than 2 mW. The optical displacement-detecting mechanism thus configured is arranged so as to be used to detect the displacement of the cantilever or probe of a scanning probe microscope.

As described above, as for intensity spectra with respect to the wavelength of the light source, use of a low coherent light source such that the width of the spectrum having the maximum intensity is made wider allows the output power of the light source to be increased without generating the mode hop noise and optical feedback noise. Thus, the quantity of light incident on the light-receiving face of the optical detector can be increased, and the percentages of the shot noise and Johnson noise with respect to the detection sensitivity can be decreased. As a result, it becomes possible to enhance the resolution of the optical displacement-detecting mechanism.

Also, the optical displacement-detecting mechanism according to the invention is arranged so that the cantilever or probe of a scanning probe microscope is driven in a liquid solution. In this case, an optically transmissive base having an arbitrary transmittance with respect to the light used in the light source is inserted in the optical path between the light source and the cantilever or probe as a target for measurement. Further, a liquid solution is filled in a space between the base and the target for measurement so that boundaries of the liquid solution are in contact with boundaries of the base and target for measurement. In addition, the cantilever or probe is disposed in the liquid solution.

By making an arrangement like this, even when reflected light is generated by reflection on a surface of the base and the interface of the liquid solution and base, the optical feedback noise and mode hop noise are not produced. Therefore, the following are made possible: to increase the output power of the light source; to increase the quantity of incident light on the light-receiving face of the optical detector; to reduce the percentages of the shot noise and Johnson noise with respect to the detection sensitivity; and consequently to enhance the resolution of the optical displacement-detecting mechanism.

The optical displacement-detecting mechanism according to the invention is arranged so that the light-receiving face of the optical detector is divided into four or two, the target for measurement is irradiated with light from the light source, and the light-receiving face receives light reflected by the target for measurement. Alternatively, the optical displacement-detecting mechanism may be arranged so that the target for measurement is irradiated with light from the light source, and a shadow of the target for measurement is projected on the light-receiving face of the optical detector.

By making an arrangement like this, particularly the resolution of measurement of a scanning probe microscope can be enhanced.

Further, in the optical displacement-detecting mechanism in accordance with the invention, a super luminescence diode (SLD) is used for the light source. The half width of spectrum of an SLD is roughly about 10 to 25 nm. An SLD is wider in spectrum width in comparison to a semiconductor laser, and a low coherent light source. Therefore, even when an SLD is driven with a high output power, the optical feedback noise and mode hop noise are not produced. In addition, an SLD is narrower in spectrum width in comparison to the spectrum half width of an light-emitting diode (roughly 20 to 70 nm), and therefore a spot of light can be focused on the target for measurement.

For example, as for cantilevers for scanning robe microscopes, the width of a cantilever is not more than 30 μm in general. When the spot of light is made larger than that size, the spot bulges out of the range of the target for measurement. As a result, the loss of light on the optical path is made larger, and the transmission efficiency is decreased. However, as the spot can be reduced in size, the transmission efficiency can be also increased. In addition, as an SLD is inferior in coherence to a semiconductor laser, the interference noises owing to the light reflected by the cantilever and the light which has bulged out of the range of the cantilever and undergone the reflection by the sample are suppressed.

In the optical displacement-detecting mechanism in accordance with the invention, an optical member with a reflecting surface of an arbitrary reflectance having a polarization dependence is inserted in an optical path from the light source through the target for measurement to the optical detector. In addition, a light source having a polarization dependence is used. Further, the light source and optical member are disposed so that the reflectance of the optical member depending on the direction of polarization of the light source becomes higher. The optical path is bent by reflection of light by the optical member.

Also, in the optical displacement-detecting mechanism, an optical member with a reflecting surface of an arbitrary reflectance, to which a coat is applied so that the reflectance has a wavelength dependence, is inserted in an optical path from the light source through the target for measurement to the optical detector. The characteristics of the coat are set so as to make higher the reflectance of the optical member with respect to a wavelength when the intensity of the light source becomes maximum. The optical path is bent by reflection of light by the optical member.

Further, in the optical displacement-detecting mechanism, a wavelength of the light source is not less than 700 nm, and a reflecting member coated with gold or gold alloy is disposed on an optical path from the light source through the target for measurement to the optical detector. The optical path is bent by reflection of light by the reflecting member.

By making an arrangement like this, it becomes possible to construct a compact optical displacement-detecting mechanism with the transmission efficiency increased.

Further, in the optical displacement-detecting mechanism in accordance with the invention, the target for measurement is a cantilever, and coats identical with each other in material and thickness are applied to two opposing faces of the cantilever.

Also, in the optical displacement-detecting mechanism, the wave length of the light source is not less than 700 nm, the target for measurement is a cantilever, and coats of gold or gold alloy are applied to one of or two opposing faces of the cantilever.

By making an arrangement like this, the cantilever per se serves as a reflecting member, the reflectance on the reflecting surface of the cantilever can be raised, and the transmission efficiency can be increased. In the case of applying coats to the cantilever, the heat of light coming from the light source and radiated to the cantilever produces a warp in the cantilever owing to the difference in linear expansion coefficient between the base material of the cantilever (which is silicon or silicon nitride, usually) and the applied material as a coat. However, when coats are applied to both the faces of the cantilever, the difference in linear expansion coefficient is canceled out by the coating to the two opposing faces of the cantilever, and therefore no warp is caused in the cantilever even when the quantity of incident light is increased.

In the optical displacement-detecting mechanism in accordance with the invention, light from the light source is transmitted through an optical fiber, and then the target for measurement is irradiated with the light. When an optical fiber is used to lead light to a target for measurement in this way, the displacement of the target for measurement can be detected even in a narrow room. In the case where light enters the optical fiber, the optical feedback noise and fluctuations of the light intensity are generated owing to the light reflected by the end face of the optical fiber. However, such noises are prevented by use of the light source having a wide spectrum width. Particularly, use of an SLD raises the coupling efficiency with the optical fiber, whereby the transmission efficiency can be increased.

As described above, an optical displacement-detecting mechanism in accordance with the invention incorporates a light source of a low coherence, which has a spectrum half width in a range of not less than 10 nm, preferably not more than 25 nm, and therefore the output power of the light source can be raised to 2 mW or higher without causing the mode hop noise and optical feedback noise. As a result, the following are made possible: to increase the quantity of light incident on the light-receiving face of the optical detector; and to reduce the percentages of the shot noise and Johnson noise with respect to the detection sensitivity. Consequently, the resolution of the optical displacement-detecting mechanism can be enhanced.

In addition, the reflectance of the reflection mirror located on the optical path and the reflectance of a target for measurement are arranged to accommodate the characteristics of the polarization and wavelength of the light source, whereby the following are made possible: to increase the light transmission efficiency of the optical path from the light source through the target for measurement to the optical detector; to increase the quantity of light incident on the light-receiving face of the optical detector; and to reduce the percentages of the shot noise and Johnson noise with respect to the detection sensitivity. As a result, the resolution of the optical displacement-detecting mechanism can be enhanced.

Further, an SLD having a spectrum half width of not less than 10 nm and not more than 25 nm is used as a light source, whereby the diameter of a spot of light cast on the target for measurement can be reduced, and therefore the loss of light owing to light bulging out of the range of the target for measurement can be prevented. Further, in the case of using an optical fiber for transmitting the light, the coupling efficiency with the optical fiber can be enhanced. On this account, the quantity of light incident on the light-receiving face of the optical detector can be increased by raising the transmission efficiency. Further, the percentages of the shot noise and Johnson noise with respect to the detection sensitivity can be reduced, and therefore the resolution of the optical displacement-detecting mechanism can be enhanced.

DESCRIPTION OF THE PREFERRED EMBODIMENTS

A scanning probe microscope in association with the invention will be described below with reference to the drawings.

First Embodiment

Figure 1:
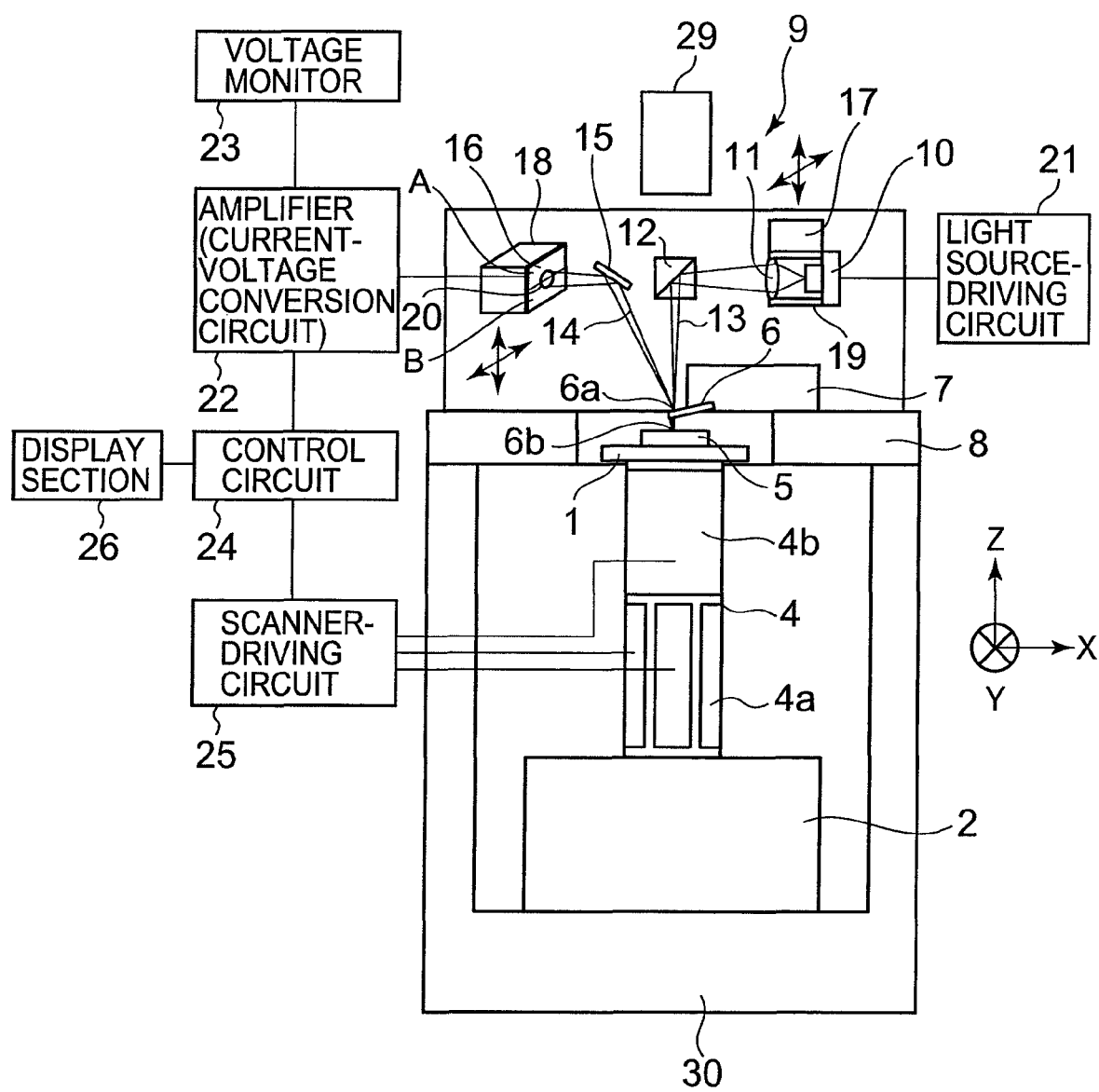
FIG. 1 is a general schematic illustration of an optical displacement-detecting mechanism for a scanning probe microscope in association with the first embodiment of the invention.
Figure 2:
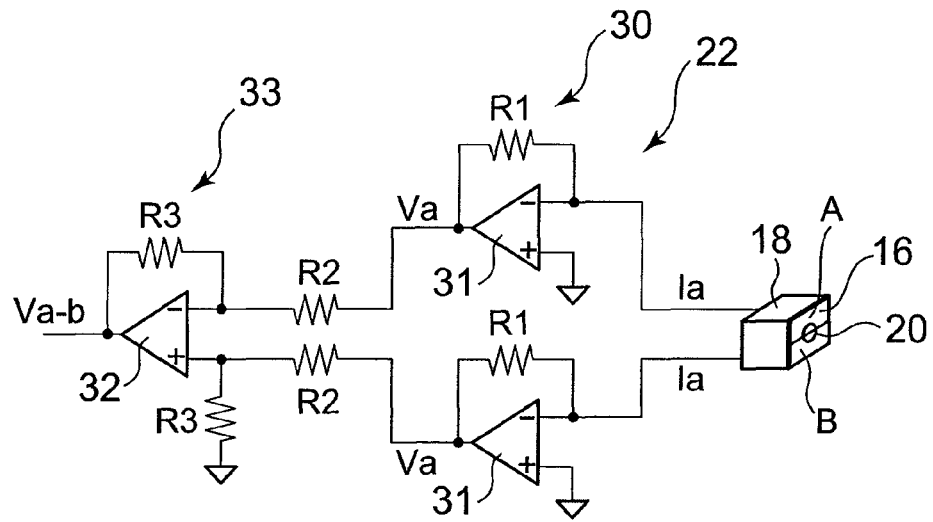
FIG. 2 is a circuit diagram of an amplifier including a current-voltage conversion circuit shown in the FIG. 1.

FIGS. 1 and 2 show an optical displacement-detecting mechanism in accordance with the first embodiment of the invention. FIG. 1 is a general schematic illustration showing a situation where an optical displacement-detecting mechanism in association with the invention is applied to a scanning probe microscope. FIG. 1 presents a front view, however it partly includes a perspective view of an optical detector. FIG. 2 is a circuit diagram of an amplifier 22 including a current-voltage conversion circuit shown in FIG. 1.

In this embodiment, the optical displacement-detecting mechanism has a three-axis micro-moving mechanism 4 composed of a cylindrical piezoelectric device having a tip with a sample holder 1 fixed and a bottom end fixed on a roughly moving mechanism 2. The three-axis micro-moving mechanism 4 has an XY scanner part 4a for scanning a sample 5 put on a sample holder 1 in a direction in a sample plane (i.e. X-Y plane), and a Z micro-moving mechanism 4b for moving the sample in a direction perpendicular to the sample plane (Z direction) finely.

Above the sample 5, a cantilever 6 is fixed on a cantilever holder 7 fixed to a base 8. The cantilever 6 has a probe 6b on a tip of a cantilever part 6a; the probe 6b has a tip tapered and sharpened. The cantilever 6 is made from silicon as a base material, and is coated with chromium as a primary coat to a thickness of 10 nm and then coated with gold to a thickness of 100 nm so that the resultant coating thicknesses are the same on front and rear faces of the cantilever. The optical displacement-detecting mechanism 9 is arranged over the cantilever 6.

Now, the operational principle of a scanning probe microscope in association with this embodiment will be described here. The scanning probe microscope in association with this embodiment is an atomic force microscope, which is a kind of scanning probe microscope and used for measurement of an asperity image of a sample surface. In this embodiment, a system which is termed a contact type atomic force microscope in general is used.

When the roughly moving mechanism 2 brings the sample 5 close to the probe 6b, an atomic force acts between the probe 6b and sample 5, and thus an attractive force works on the probe 6b. When the sample 5 is brought closer to the probe 6b, a repulsive force begins to act on the probe 6b, and thus the probe 6b and sample 5 are finally brought into contact with each other. At this time, deflection is caused in the cantilever part 6a depending on a force which acts on the probe 6b. The force which the probe 6b receives, i.e. the quantity of deflection of the cantilever part 6a, depends on the distance between the surfaces of the probe 6b and sample 5.

Therefore, an uneven contour of a surface of the sample 5 can be obtained by raster-scanning the sample 5 with the XY scanner part 4a while using the Z micro-moving mechanism 4b to change the distance between the probe 6b and sample 5 so that the quantity of deflection of the cantilever part 6a is made constant.

Next, a configuration of the optical displacement-detecting mechanism 9 in accordance with this embodiment and its operational principle will be described.

The optical displacement-detecting mechanism 9 is termed an optical lever system in general. The optical displacement-detecting mechanism incorporates a super luminescence diode (SLD) as a later-described light source 10, in which light emitted from the light source 10 is condensed with a condenser lens 11, the optical path of incident light 13 is bent by a beam splitter 12, and the backside of a cantilever part 6a as a target for measurement is irradiated with the incident light directly from the topside thereof in a vertical direction (from Z direction). The intensity of light of the light source 10 is set with a light source-driving circuit 21.

The cantilever 6 is tilted with respect to the X-Y plane. The reflected light 14 is reflected toward a direction different from the optical axis of incident light 13. The reflected light 14 is bent by a mirror 15 and enters an optical detector (photo detector) 16 made from a semiconductor.

The optical path of light is arranged so that the light is focused on the backside of the cantilever part 6a once, and forms a spot 20 having a finite size on a light-receiving face of the optical detector 16. The optical detector 16 is manufactured from a semiconductor material, and the light-receiving face is divided into two (areas A and B).

When light enters the optical detector 16, current signals are generated in the semiconductor from which the optical detector 16 is formed. The current signals are converted into voltage signals with a different predetermined amplification factor from a light-receiving face area to another by use of the amplifier 22 provided downstream of the optical detector 16, which includes a current-voltage conversion circuit 30 and a differential amplifier circuit 33. The outputs thus obtained are displayed by a voltage monitor 23.

When the cantilever part 6a is deflected in Z direction, the spot 20 on the optical detector 16 is shifted upward and downward in the light-receiving face. The flow of a light detection signal thus generated will be described with reference to a circuit diagram of the amplifier 22 including the current-voltage conversion circuit shown in FIG. 2.

When the intensity Pa of light entering the area A of the light-receiving face located on the upper side of the optical detector 16 and the intensity Pb of light entering the area B of the light-receiving face located on the lower side are measured, the quantity of deflection of the cantilever part 6a can be measured. When lights having intensities of Pa and Pb enter the optical detector 16, the optical detector 16 converts the light signals into electric signals, and then currents Ia and Ib are generated in the respective light-receiving face areas A and B. The currents are converted into voltage signals Va and Vb by the current-voltage conversion circuit 30 including operational amplifiers 31 and resistors R1, which are connected with the respective light-receiving face areas. When the feedback resistance value of the current-voltage conversion circuit 30 is represented by R1, the following relations hold:

$$Va = R1 \times Ia; \text{ and}$$

$$Vb = R1 \times Ib.$$

As described above, the current signals are amplified with an amplification factor R1 and converted into voltage signals in the current-voltage conversion circuit 30 of the first stage. The voltage signals Va and Vb are sent to the differential amplifier circuit 33 constituted by an operational amplifier 32 and resistors R2 and R3, and thus a voltage difference signal Va−b is detected. In the case where the differential amplifier circuit is constituted by an operational amplifier and resistors having resistance values R2 and R3 as shown in the drawing, the following relation holds: Va−b=(R3/R2)×(Va−Vb) holds. Then, the difference between the voltage signals is amplified with an amplification factor of R3/R2 by the differential amplifier circuit and Va−b is output. When the Va−b is detected, the quantity of deflection of the cantilever can be measured.

In this embodiment, an optical detector 16 having a light-detection sensitivity of 0.65 A/W is used, and the feedback resistance value R1 of the current-voltage conversion circuit 30 is 45 kΩ. The values of the resistors of the differential amplifier circuit 33 are as follows: R2=10 kΩ, and R3=20 kΩ. The absolute volume of the shot noise is in proportion to the feedback resistance R1, and the detection sensitivity is also in proportion to R1. Therefore, when the ratio of the shot noise with respect to the detection sensitivity is determined, the shot noise is balanced out. Further, in the case where the quantity of incident light entering the optical detector 16 is made larger, when the amplification factors are set to the same values as those in the art, the detection sensitivity is excessively high, and a control circuit 24 is prone to oscillate. Therefore, the feedback resistance value R1 is made smaller in comparison to that in the art, whereby oscillation of the system is suppressed.

The voltage signal Va−b is sent to the control circuit 24 shown in FIG. 1, and a comparison of the voltage signal with a preset operating point is made. Then, a scanner-driving circuit 25 is made to operate the Z micro-moving mechanism 4b by means of a signal in accordance with the difference between the voltage signal and preset point under the control of the control circuit 24, during which the distance between the sample 5 and probe 6b is kept constant. Also, the scanner-driving circuit 25 is used to operate the XY scanner part 4a thereby to raster-scan the sample 5.

During this time, a display section 26 is made to display voltage signals applied to the three-axis micro-moving mechanism 4, whereby an asperity image of a surface of the sample 5 can be obtained.

Now, the characteristics of an SLD used for the light source 10 will be described here. The SLD used in this embodiment has a central wavelength of 830 nm, and a maximum rated power of 6 mW, in which the half width of intensity spectra with respect to wavelengths is 17 nm. SLDs placed on the market commonly are a low-coherent light source, the half width of spectra of which lies in a range between 10 and 25 nanometers, which is narrower in contrast with that the half width of spectra of a semiconductor laser (LD) is several nanometers. On this account, SLDs are low in coherence in comparison to LDs, in which the optical feedback noise owing to light reflected by a target for measurement and an optical member located on the optical path is limited. In addition, the mode hop noise is not caused. When an LD is driven with a high power, the optical feedback noise and mode hop noise are caused noticeably. Therefore, it is required to cut an optical feedback by means of e.g. high frequency driving or a polarizing plate. However, in the case of an SLD, it is possible to achieve a high output power without taking such measure. Further, in the case of a light-emitting diode (LED), the half width of spectra ranges from about 20 to 70 nanometers typically, which is low in coherence. Light emitted by an LED is hard to reduce in size by use of a lens. Therefore, an LED has a difficulty in forming a small spot on a backside of a cantilever and an optical detector, and a poor coupling efficiency with an optical fiber. In contrast, with an SLD, it is possible to ensure the light condensability. As described above, in the case of an LD used in a conventional scanning probe microscope, the original power of a light source is limited up to 2 mW, whereas in accordance with the invention, the light source 10 can be driven with a power of 2 mW or larger without any influences of the mode hop noise and optical feedback noise. Incidentally, in this embodiment the light source is driven with a power of 3 mW.

As the output power of light from the light source can be increased in this way, the quantity of incident light on the optical detector can be raised, too. This allows the shot noise and Johnson noise to be suppressed. Thus, the noise percentage with respect to the detection sensitivity is made smaller, which makes it possible to increase the resolution.

When considering of the interference of the light reflected by the cantilever and the light which has bulged out of the range of the cantilever and undergone reflection by a sample, use of an SLD enables the reduction in the size of a spot light cast on a target for measurement, and therefore reduces the light which bulges out of the range of the cantilever. In addition, as the light source per se is low in coherence, the interference noise is also suppressed.

In accordance with the invention, it is preferable to use an SLD for the light source 10. However, other light sources such as an LED are included within a scope of the invention as long as the half width of spectra is 10 nm or larger. This is because such light sources can be driven with a high output power of 2 mW or larger without any influences of the mode hop noise and optical feedback noise.

Further, in accordance with the invention, a configuration such that the transmission efficiency α of an optical system is made higher in addition to an increase of the quantity of light of the light source 10 is adopted, and therefore the light incident on the optical detector 16 is increased.

Specifically, a reflecting surface of the beam splitter 12 lying on the optical path is coated with a dielectric substance so that the reflectance in a near-infrared region with respect to a wavelength 830 nm is higher than that in a visible light region, first. The beam splitter 12 has a dependence on the polarization of light, and S polarized light (perpendicular to the sheet of paper) is applied to the beam splitter, whereby the reflection efficiency is increased. As light from the SLD 10 is polarized, the SLD 10 is placed so that S polarized light impinges on the reflecting surface of the beam splitter 12 in parallel. In the case of using a beam splitter of a type having no dependence on the polarization of light, the reflectance is 0.5. However, when a beam splitter of a type having dependence on the polarization of light is used and the reflectance in a near-infrared region is increased, the reflectance is increased to 0.7.

Next, the cantilever 6 is coated with gold. Typically, the cantilever 6 is coated with aluminum so that the cantilever serves as a reflecting member operable to reflect light. However, to increase the reflectance with respect to a wavelength of 830 nm in the near-infrared region, provided that 830 nm is an oscillation wavelength of the SLD 10, gold is adopted here. The reflectance with respect to the wavelength of 830 nm can be increased to 0.95 for gold, whereas that of aluminum is 0.88. Incidentally, to enhance the adhesion of silicon as a base material with gold, both sides of the cantilever are coated with chromium as a primary coat.

When light is applied to the cantilever 6 with no coating with a high output power, the light increases the temperature of the cantilever 6, and thus a warp is caused in the cantilever 6 owing to the difference in linear expansion coefficient between the base material of the cantilever 6 and the coated metal. To prevent the occurrence of such warp, in this embodiment, a film of gold is deposited to both the sides of the cantilever 6 by sputtering so as to have the same thickness on the sides, and then a film of chromium is deposited in the same way. As a result, the difference in linear expansion factor is canceled by the metals on both the sides, and the occurrence of a warp is prevented. When the influence of a warp is large, such films do not have to be deposited, while the reflectance is somewhat sacrificed. In this case, the quantity of light incident on the optical detector can be ensured by increasing the power of light source 10 by a decrease of the reflectance of the cantilever 6. In the case where a warp does not matter in terms of measurement, only coating on one side of the cantilever suffices.

In the case where light cast on the cantilever part 6a cannot be reduced in size, the light bulges out of the range of the cantilever part 6a, causing an optical loss. However, use of an SLD enables the reduction in spot size of light up to about 10 μm. A typical cantilever has a width of 10 to 30 μm, and therefore such cantilever can almost avoid the light which bulges out of the range of the cantilever. The mirror 15 which serves as a reflecting member for bending the optical path toward a direction of the optical detector 16 after reflection by the cantilever has been coated with aluminum in the past, whereas the mirror 15 is coated with gold in this embodiment. As a result, the reflectance of the gold-coated mirror can be increased to 0.95, although the reflectance achieved by a coat of aluminum with a protection film is 0.79.

By use of an optical system as described above, the invention achieves 3 mW as an output of the light source, 1.05 mW as an irradiation power to the cantilever, and 0.87 μW as an incident power on the optical detector.

The following are made possible by taking measures as described above: to increase the transmission efficiency α of the optical system; to increase the quantity of incident light on the optical detector further; and to reduce the noise percentage with respect to the detection sensitivity of the optical detector thereby to enhance the resolution.

While in this embodiment an optical detector having a light-receiving face divided into two, upper and lower halves, is used as the optical detector 16, another optical detector having a light-receiving face quartered into upper left, lower left, upper right and lower right portions, may be used. In this case, the following are made possible by providing a current-voltage conversion circuit for each light-receiving face portion: to detect the quantity of deflection of the cantilever part 6a based on a difference signal corresponding to the difference in voltage between the upper and lower light-receiving face portions; and to detect the quantity of torsion of the cantilever based on the difference signal in voltage between the right and left light-receiving face portions.

While in this embodiment, for the purpose of observing the sample 5 and cantilever 6 with an optical microscope 29 directly from the topsides thereof, the beam splitter 12 is used to change the optical path of the incident light 13, a total reflection mirror and a dichroic mirror may be used as a reflecting member instead of the beam splitter 12. Also, the cantilever may be directly irradiated with light without using a reflecting member. In this case, the transmission efficiency can be increased further.

Second Embodiment

Figure 3:
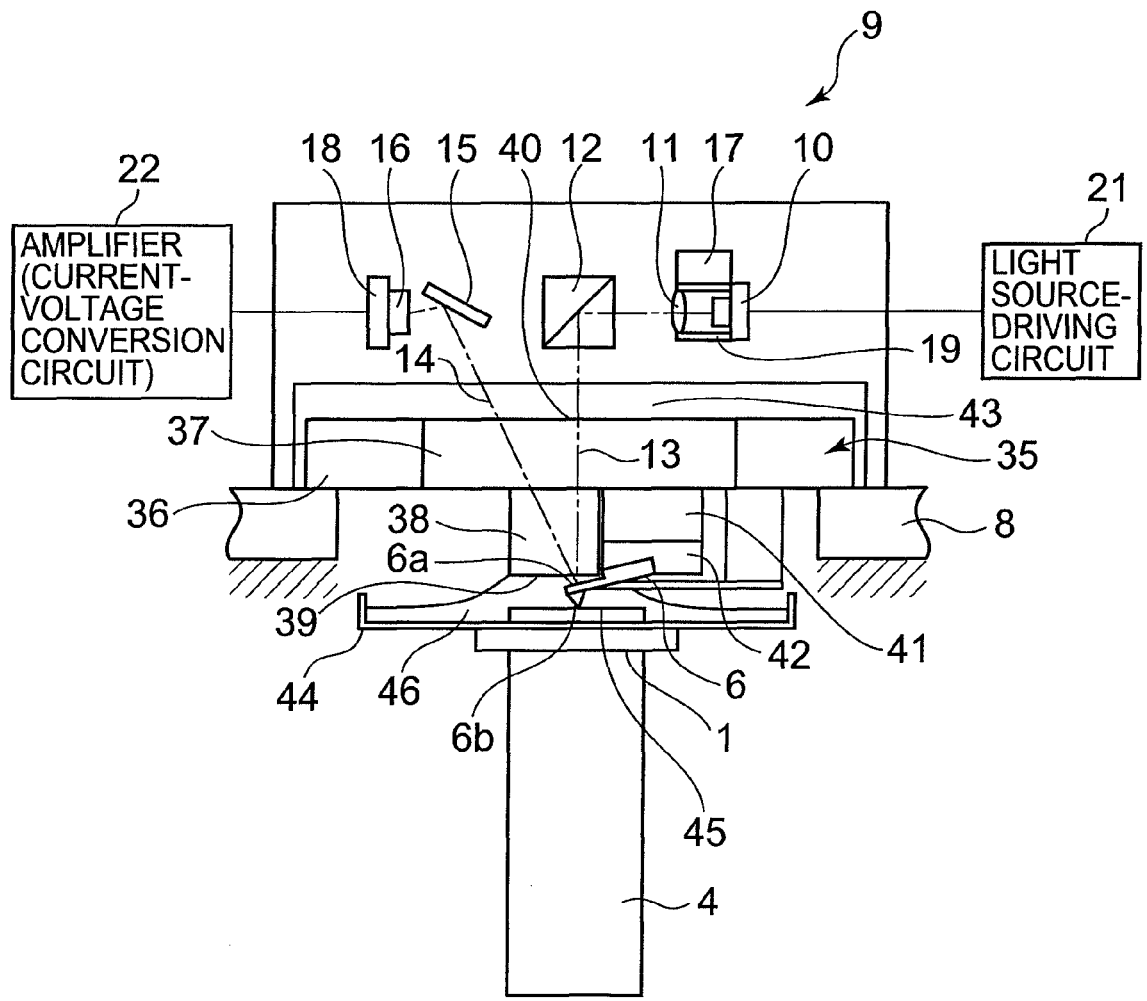
FIG. 3 is a general schematic illustration of an optical displacement-detecting mechanism for a scanning probe microscope for measuring a sample in a liquid solution in association with the second embodiment of the invention.

An optical displacement-detecting mechanism in accordance with the second embodiment of the invention will be described with reference to FIG. 3. FIG. 3 is a general schematic illustration of an optical displacement-detecting mechanism for a scanning probe microscope operated in a liquid solution. The basic configuration thereof is the same as that of the optical displacement-detecting mechanism in the first embodiment, and therefore descriptions of the parts common to the first and second embodiments are omitted here.

In this embodiment, the cantilever part 6a is brought close to a sample 45 while the cantilever part 6a is vibrated at a frequency near the resonance frequency. Then, the quantity of the decrease in amplitude owing to an atomic force produced when the cantilever is made to approach the sample and owing to an intermittent contact force, and a change in phase are detected with an optical displacement-detecting mechanism 9 of an optical lever system identical to that in the first embodiment. As the quantity of the decrease in amplitude and the quantity of the change in phase depend on the distance between the sample 45 and probe 6b, it is possible to perform control of the distance between the probe 6b and sample 45. As described above, in this embodiment a vibration-type atomic force microscope is used. The cantilever holder 35 in this embodiment is composed of a metal base block 36 and a glass base block 37. A vibrator 41 composed of a piezoelectric device for vibrating the cantilever and a cantilever-fixing part 42 are fixed to the glass base block 37 by an adhesive. To the cantilever-fixing part 42 is fixed the cantilever 6. The periphery of the vibrator 41 is subjected to a waterproof treatment with a silicon sealing compound to prevent a short circuit because it is used in a liquid solution.

The glass base block 37 is provided with a protruding portion 38 which has a top end machined so as to be flat. On a sample holder 1 on a three-axis micro-moving mechanism 4 composed of a cylindrical piezoelectric device, a laboratory dish 44 is put. In the laboratory dish 44, e.g. a living body such as a cell and an organic thin film, which are immersed in a liquid solution 46, are to be fixed as a sample 45.

When the sample 45 and probe 6b are brought close to each other, a flat face portion 39 of the protruding portion 38 is brought into contact with a surface of the solution in the laboratory dish owing to surface tension. Thus, a liquid layer 46 is formed, and the cantilever 6 and sample 45 are immersed in the liquid solution.

As for the optical displacement-detecting mechanism 9, an SLD is used as its light source 10 as in the case of the first embodiment. Light from the SLD is condensed with the condenser lens 11. The optical path of an incident light 13 is bent by a beam splitter 12. The backside of a cantilever part 6a as a target for measurement is irradiated with the light directly from the topside thereof (from Z direction). The intensity of light of the light source 10 is set by a light source-driving circuit 21. The glass base block 37 of the cantilever holder 35 is made of quartz glass, which the light of 830 nm as a wavelength of the SLD can travel through. After the incident light is bent by the beam splitter 12 in an airspace, it travels through the glass base block 37 to reach the liquid layer 46, and then is cast on the backside of the cantilever part 6a. The laser beam reflected off the backside of the cantilever part 6a passes through the liquid layer 46 and the glass base block 37, travels through a mirror 15 and then enters an optical detector 16 having a light-receiving face divided into two. The optical detector 16 is connected with an amplifier circuit 22 including a current-voltage conversion circuit. The amplifier circuit 22 is the same as the circuit shown in FIG. 2 in association with the first embodiment. Now, in the case where the cantilever part 6a is forced to vibrate in the liquid solution, the accuracy of measurement is often deteriorated. This is because a detection signal of amplitude carries noises of frequencies other than a resonance frequency of the cantilever part 6a under the influences of: the viscous resistance from the liquid solution which the cantilever part 6a suffers; and the light scattered by a member through which the light travels. This is to be described later. Therefore, for the purpose of removing the noises, a band-pass filter for removing frequency components other than the frequencies near a resonance frequency of the cantilever part 6a may be provided downstream of the differential amplifier circuit 33 of the amplifier 22.

Now, as the incident light 13 is reflected off an interface 40 of the glass base block 37 and airspace 43, and an interface 39 of the glass base block 37 and liquid layer 46 respectively, the optical feedback to the light source 10 is made larger in comparison to the case of the first embodiment in which measurement is performed in air. With a semiconductor laser which has been used as a light source in a conventional optical displacement-detecting mechanism, the output of a light source has been hard to increase because the optical feedback causes the optical feedback noise and mode hop noise. Therefore, it has been impossible to reduce the noise of the optical detector with respect to the detection sensitivity. While high frequency modulation of the light source 10 enables reduction of the mode hop noise and optical feedback noise, it cannot remove the noises completely. In addition, use of the high frequency modulation has made the light source-driving circuit 21 more complicated and increased the cost. Particularly, in the case where the cantilever part 6a is forced to vibrate in a liquid solution, the viscous resistance is larger in comparison to the resistance that it receives in the atmosphere, and the vibration of the cantilever is made weaker. Therefore, unless noises with respect to the detection sensitivity are reduced, the detection accuracy of vibration is worsened, which leads to the deterioration of the accuracy of measurement.

However, as an SLD, a low coherent light source is used as the light source 10, the optical feedback noise and mode hop noise can be suppressed without using a special technique such as high frequency modulation, and therefore the output of the light source 10 can be increased. In this embodiment, the output of the light source 10 is set to be larger in comparison to the output set for the airspace in consideration of the loss when light passes through the glass base block 37, and thus the light source is driven with an output power of 4 mW. As a result, it becomes possible to reduce the percentages of the shot noise and Johnson noise with respect to the detection sensitivity of the optical detector 16. Further, the vibration of the cantilever part 6a can be detected correctly even in a liquid solution, which enables the enhancement of the resolution.

Third Embodiment

Figure 4:
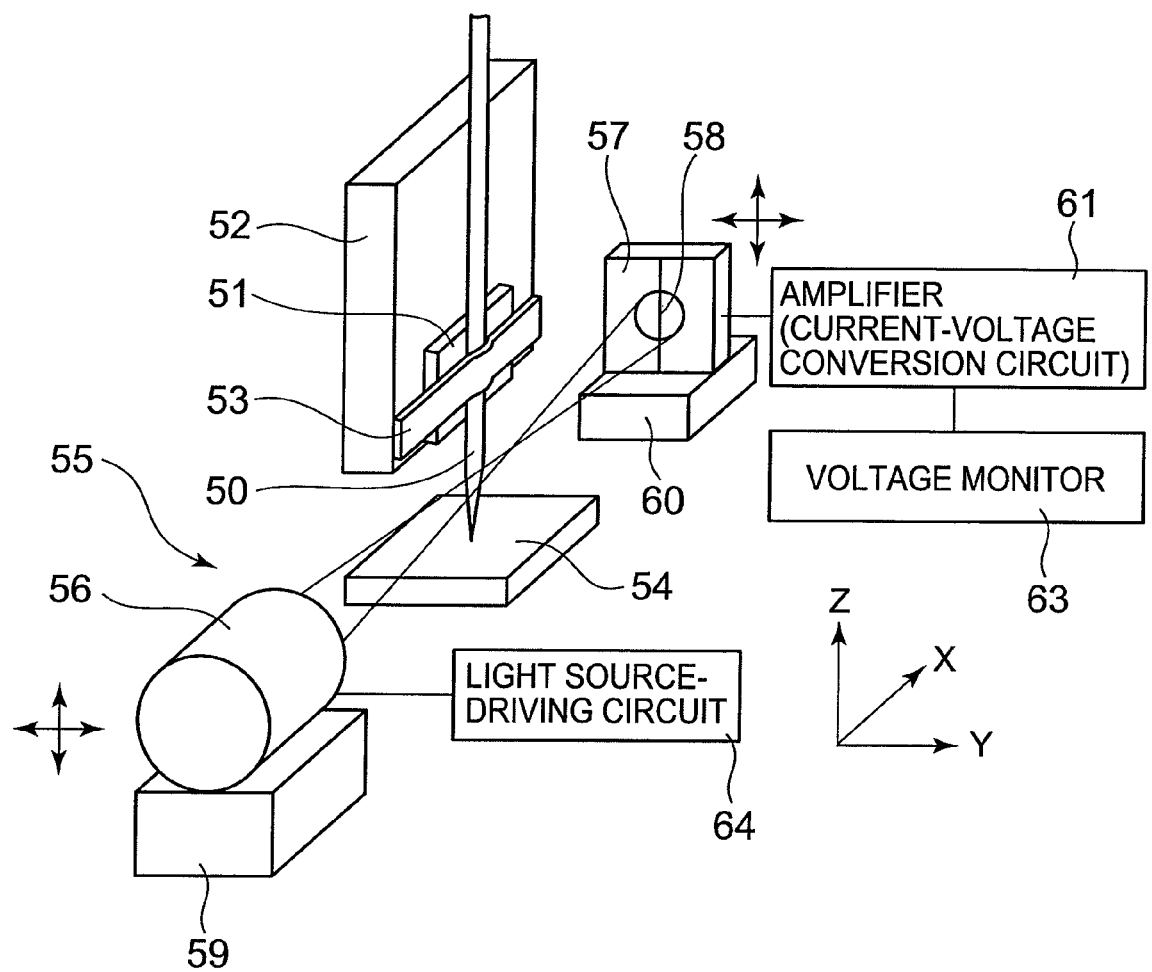
FIG. 4 is a general schematic illustration of an optical displacement-detecting mechanism for a scanning near field optical microscope in association with the third embodiment of the invention.

FIG. 4 shows the third embodiment of the invention. FIG. 4 is a general schematic illustration of an optical displacement-detecting mechanism for detecting the displacement of a probe used in a scanning near field optical microscope, which is a kind of scanning probe microscopes. In the drawing, the detailed configuration except for important parts is omitted.

A probe 50 used in this embodiment is composed of an optical fiber which has a tapered and sharpened tip and an opening provided in a tip portion, and which is coated with aluminum except for the opening. The probe 50 is fixed to a probe holder 52 by means of a leaf spring 53; the probe holder is attached with a piezoelectric device 51 for applying vibration. The probe 50 is disposed so that its long axis direction is orthogonal to a surface of a sample 54.

The probe 50 thus disposed is vibrated by the piezoelectric device 51 for applying vibration with a frequency near a resonance frequency of the probe 50 in a direction parallel to the surface of the sample 54 (Y direction in the drawing). During this time, when the tip of the probe 50 and the surface of the sample 54 are brought close to each other, the tip of the probe suffers forces including a resistance force and a friction force coming from an adsorption layer lying in a surface of the sample 54 and an atomic force. The forces are termed Shear Force collectively. When the probe 50 suffers the shear force, the amplitude of the probe 50 is reduced. The quantity of the reduction in amplitude depends on the distance between the tip of the probe 50 and the surface of the sample 54. Therefore, the distance between the sample 54 and the probe 50 can be kept constant by controlling the distance between the sample 54 and the probe 50 so that the amplitude and phase of vibration of the probe 50 are made constant while measuring the amplitude and the change of phase. Under a condition like this as in case of the first embodiment, when the probe 50 is raster-scanned over a surface of the sample 54 relatively thereto, an asperity image of the sample surface can be measured. In regard to a scanning near field optical microscope, the optical characteristics of the surface of the sample 54 can be measured at the same time by: casting light on the probe 50; generating an evanescent light near the opening portion in a tip of the probe to irradiate the sample 54 with the light, thereby to let the sample surface scatter the light; and then detecting the resultant scattered light with a detector.

A method of measuring the quantity of vibrational amplitude of the probe 50 in accordance with the embodiment will be described here. The optical displacement-detecting mechanism 55 in accordance with this embodiment includes a light source part 56 incorporating a condenser lens and a light source, and an optical detector 57 having a surface divided into two; the optical detector is formed from a semiconductor material. Light from the light source part 56 is cast on the probe 50 just from the right thereof (from X direction in the drawing). At this time, the light from the light source part 56 is focused, however an irradiation point onto the probe 50 is shifted from the focus point within the bounds of the probe 50 not interfering with all the light.

The light applied to the probe 50 is once focused, then broadens again, and impinges on the optical detector 57 disposed in a position opposite the light source part 56 with respect to the probe 50 so that it forms a finite spot 58 within a face of the optical detector.

During this time, a portion which is blocked by the probe 50 appears as a shadow in the spot 58.

In measurement, the light source part 56 is moved by use of a biaxial light-source positioning mechanism 59 provided for the light source part 56 to perform positioning so that light impinges on the probe 50, first. Second, the optical detector 57 is moved by use of a uniaxial optical detector-positioning mechanism 60 provided on the side of the optical detector 57 in the right or left direction (Y direction in the drawing), whereby positioning is performed so that the spot 58 impinges on a portion roughly at or near the center of the optical detector 57 while the output of a current-voltage conversion circuit 61 disposed downstream of the optical detector 57 is observed with a voltage monitor 63.

In the optical displacement-detecting mechanism 55 thus configured, when the probe 50 is vibrated, the difference in area between portions of the spot 58 formed on two half areas into which the light-receiving face of the optical detector 57 is divided, is changed, provided that the portions of the spot 58 are not blocked by the shadow. Therefore, the vibrational amplitude or phase of the probe 50 can be measured by detecting the difference in output of light between the two divided light-receiving face areas.

In this embodiment, an LED is used as the light source, which has a wavelength of 700 nm, and the half width of spectra of which is 35 nm. The light source 56 is driven by a light source-driving circuit 64, and used with an output power of 3 mW.

A light spot by an LED cannot be reduced in size unlike a semiconductor laser and an SLD. However, the optical fiber probe used in the embodiment has a diameter of 125 μm, which is sufficiently larger than that of a cantilever. Therefore, despite a small size of a spot, a spot formed by an LED can be measured adequately.

In the case of using a semiconductor laser as a conventional light source, it is impossible to drive the light source with a large output power of 2 mW or larger because the mode hop noise and the optical feedback noise owing to the reflected light from a probe, an optical detector, and the like are generated. However, in this embodiment, the mode hop noise and optical feedback noise are not generated because an LED which is a low coherent light source having a wide spectrum width is used, and therefore the light source can be driven with a high output power. Thus, the following are made possible: to increase the intensity of a spot on the light-receiving face of the optical detector; and to decrease the noise percentage with respect to the detection sensitivity of the optical detector. This enables enhancement of the resolution.

Fourth Embodiment

Figure 5:
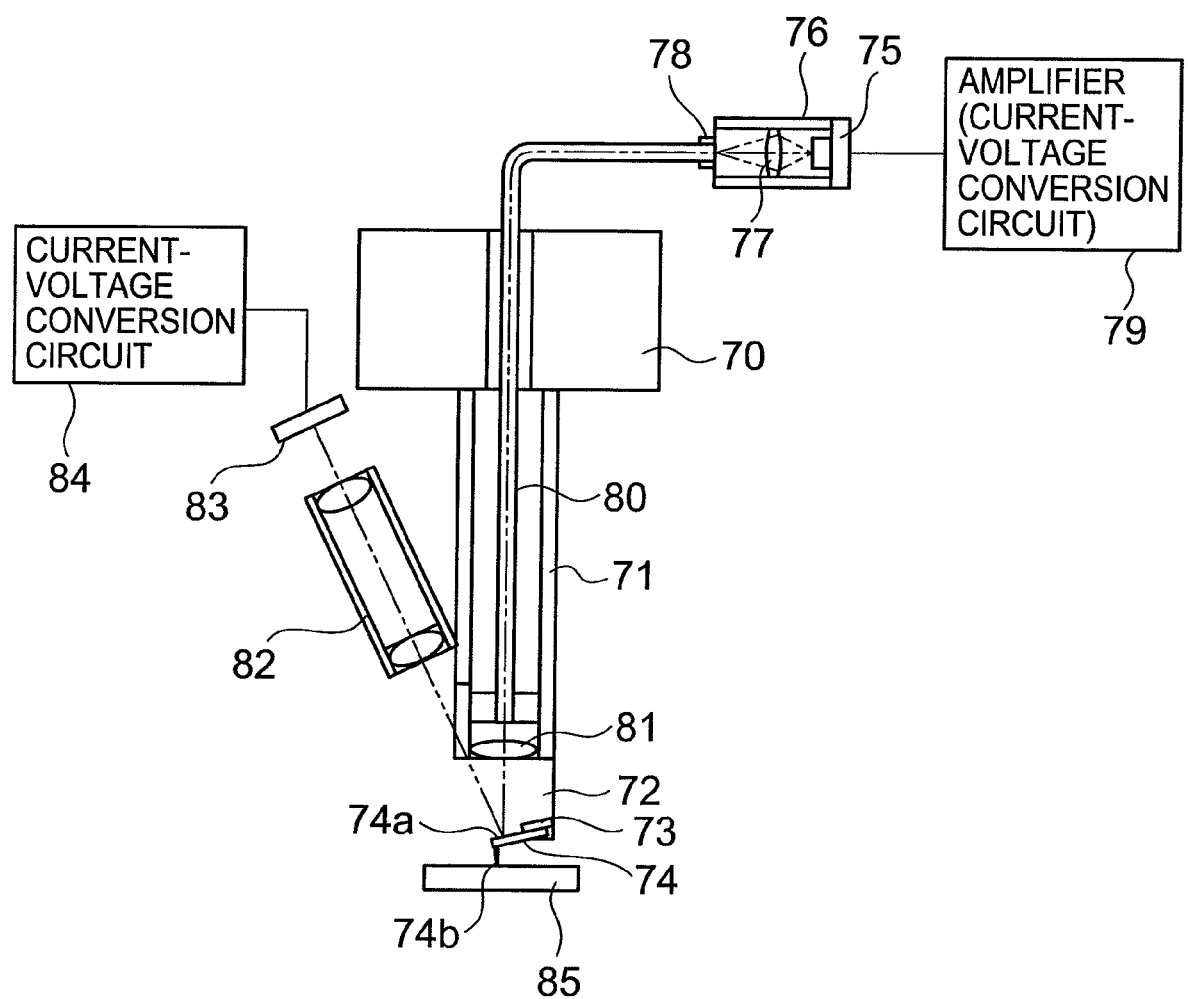
FIG. 5 is a general schematic illustration of an optical displacement-detecting mechanism for an optical fiber-transmission type scanning probe microscope in association with the fourth embodiment of the invention.
Figure 6A:
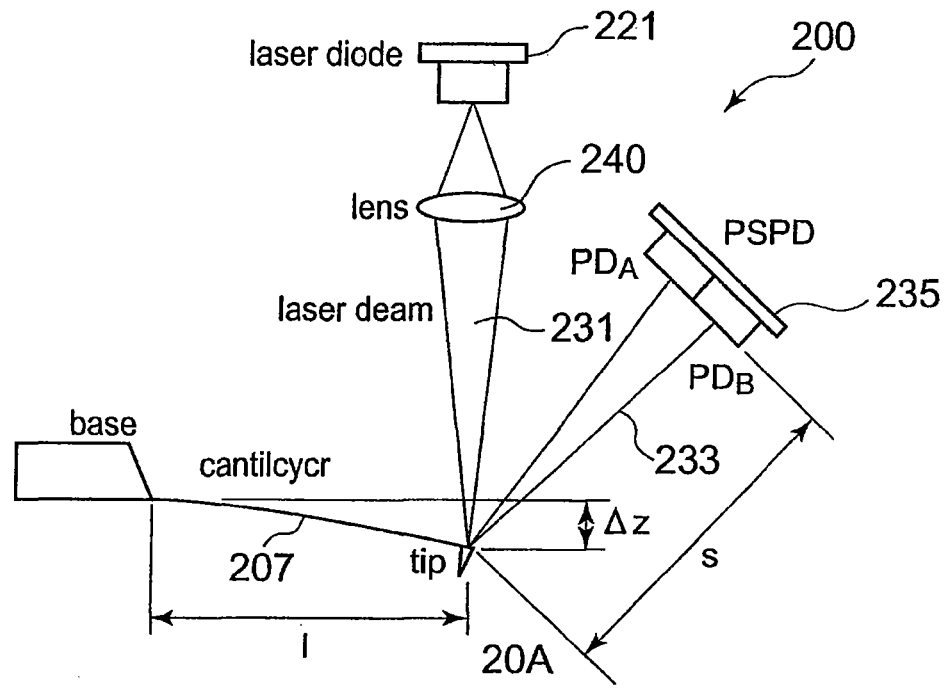
FIG. 6A is an illustration showing a configuration of an optical displacement-detecting mechanism 200 shown in FIG. 7.
Figure 6B:
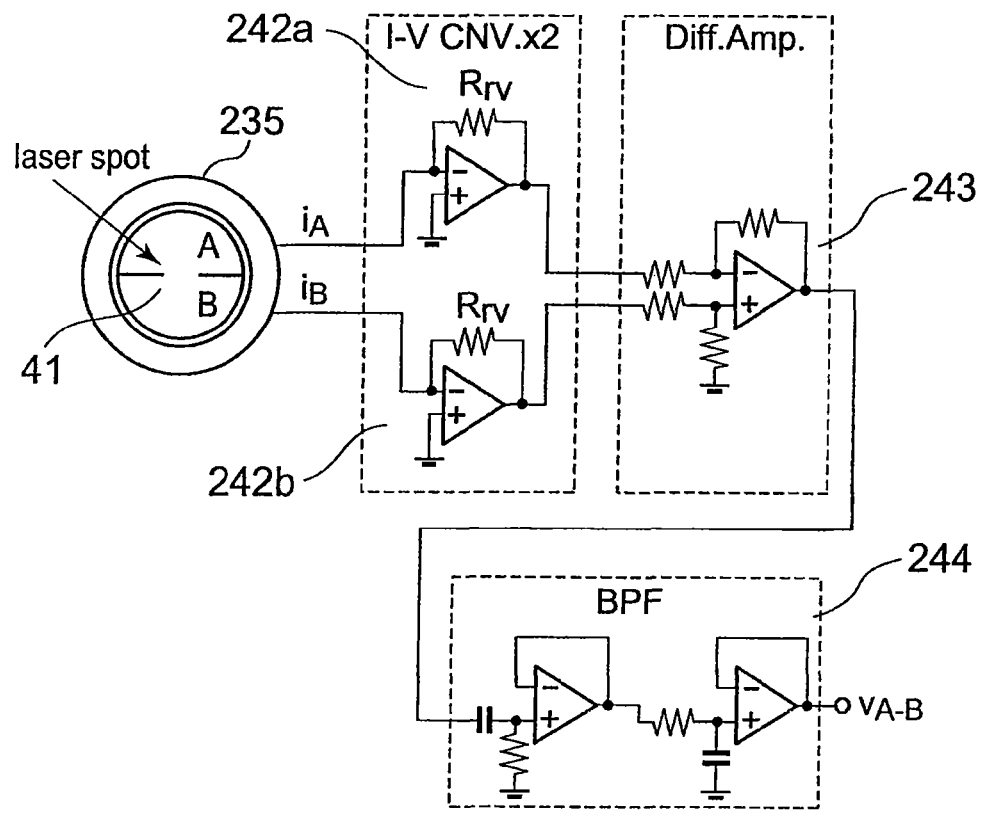
FIG. 6B is a diagram of an electric circuit connected with an optical detector 235 made from a semiconductor shown in FIG. 7.
Figure 7:
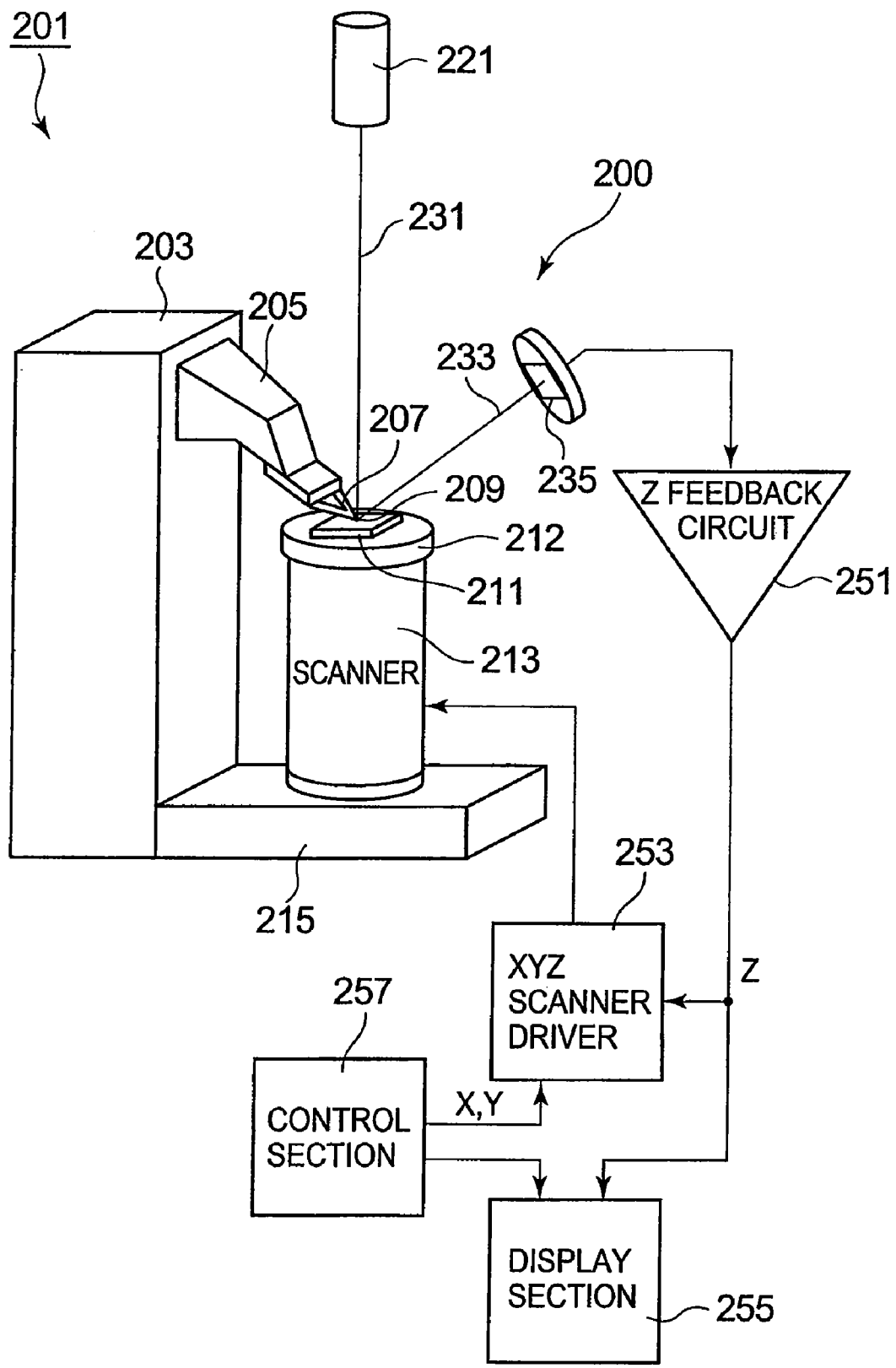
FIG. 7 is a general schematic illustration of a conventional scanning probe microscope.

FIG. 5 shows the fourth embodiment of the invention. FIG. 5 is a general schematic illustration of an optical displacement-detecting mechanism for a scanning probe microscope of a type which incorporates an optical fiber for transmitting light, irradiates a cantilever with the light, and detects the displacement of the cantilever in accordance with an optical lever technique. In this embodiment, the detailed configuration except for important parts is omitted.

In this embodiment, the optical displacement-detecting mechanism has: a cylindrical three-axis micro-moving mechanism 71 having a tail end fixed to a base 70; a cantilever holder 72 fixed to a leading end of the three-axis micro-moving mechanism; and a piezoelectric device 73 for vibrating a cantilever 74 attached to the cantilever holder 72, in which the cantilever 74 is fixed to the cantilever holder 72. A sample 85 is placed in a position opposite to a probe 74*b* provided on the cantilever 74.

In a place apart from the three-axis micro-moving mechanism 71, a light source unit 76 including a light source 75, a condenser lens 77, and an optical fiber connector 78 is provided. An SLD is used as the light source 75. The SLD is driven by a light source-driving circuit 79. To the optical fiber connector 78 is connected a single-mode optical fiber 80 for 830 nm, which is a central wavelength of the SLD. Light from the SLD 75 is coupled to a tail end of the optical fiber by the condenser lens 77.

The optical fiber 80 extends through the inside of the cylindrical three-axis micro-moving mechanism 71, and has a leading end fixed to a leading end of the three-axis micro-moving mechanism. Also, on the leading end of the three-axis micro-moving mechanism 71 is fixed a condenser lens 81. The light transmitted to the leading end of the optical fiber is condensed by the condenser lens 81 again, and focused on the backside of the cantilever 74a. As all of the leading end of the optical fiber 71, the condenser lens 81, and the cantilever 74 are fixed to the leading end of the three-axis micro-moving mechanism 71, the place of a spot of light focused on the backside of the cantilever 74a is not displaced even when the three-axis micro-moving mechanism 71 is driven.

Light reflected off the backside of the cantilever 74a is focused by a lens unit 82 on a semiconductor optical detector 83 having a quartered light-receiving face, whereby a spot of light is formed. The semiconductor optical detector 83 is connected with an amplifier 84 including a current-voltage conversion circuit. With the semiconductor optical detector thus configured, the displacement of the cantilever 74a is detected. The lens unit 82 is fixed independently of the three-axis micro-moving mechanism 71, and has a tracking lens structure such that a spot of light on the optical detector 83 never moves even when the three-axis micro-moving mechanism 71 is driven to scan the cantilever 74.

In this embodiment, a measurement is performed in accordance with the principle of a vibration-type atomic force microscope with a configuration as described above. In the first to third embodiments, a sample is scanned, whereas the cantilever 74 is scanned in this embodiment. Therefore, it is also possible to measure a sample of a large size. In the case of scanning the cantilever like this, it is required that a component driven by the three-axis micro-moving mechanism 71 be reduced in weight as much as possible, thereby to raise the resonance frequency of the three-axis micro-moving mechanism 71 for high speed driving. However, the weight reduction of the mechanism which is to be attached to the leading end of the three-axis micro-moving mechanism 71 can be realized by separating the light source unit 76 and the three-axis micro-moving mechanism 71 from each other to dispose them outside independently, and transmitting light with the optical fiber 80.

Now, in a conventional case where a semiconductor laser is used as the light source, it has been impossible to increase the output of the light source because of the optical feedback noise owing to the light reflected off an end surface of an optical fiber 80, and the mode hop noise of an LD. However, when an SLD is adopted, the occurrence of the noises can be suppressed thereby to increase the output of the light source. In contrast to an LED or the like, in the case of using an SLD, light can be reduced in size with a lens, and therefore the following are made possible: to enhance the coupling efficiency to the optical fiber; to suppress the coupling loss thereby to raise the light transmission efficiency to the optical detector.

As in this embodiment, the configuration as described above enables the increase in output of the light source as well as raise in transmission efficiency, the intensity of the spot on the light-receiving face of the optical detector can be increased, and the noise percentage with respect to the detection sensitivity of the optical detector can be reduced, which enables the enhancement of the resolution.

The invention is not limited to the embodiments which have been described above.

For instance, in the case where the output of the light source is relatively stable, and the target for measurement is a small probe, a spot of light can be reduced in size with an optical lens. Further, while in the case where an optical fiber is used to transmit light, it is desirable to use a super luminescence diode (SLD) superior in the coupling efficiency to an optical fiber, a desired light source such as an LED or a white light source may be applied as long as the half width of spectrum intensities is 10 nm or larger.

The output power of the light source may be raised within the bounds of the light source working with stability as long as the power is 2 mW or larger. In general, the output power of a light source is prone to be influenced by heat generation by the light source, and the ambient temperature. However, the light source can be driven with a higher output power with stability by using a heat sink to radiate heat, or by controlling the temperature of the light source with e.g. a Peltier device.

During measurement by a scanning probe microscope, the reflected light from the cantilever and the light which has bulged out of the range of the cantilever and undergone reflection by a sample interfere with each other, which may produce interference fringe noises in an asperity image and the relation of a force applied to the probe with respect to the distance between the probe and sample (a force curve). However, in accordance with the invention, a low coherent light source having a spectrum intensity half width of 10 nm or larger is used, and therefore the coherence can be lowered and the interference fringe noises can be reduced significantly.

While in this embodiment an optical detector which is fabricated from a semiconductor material and has a light-receiving face divided into four or two is used, a desired detector which is operable to convert the intensity of light into an electric signal may be used. For example, a semiconductor device termed a position sensitive detector (PSD) is commercially available, which has no divided light-receiving face and is made from a semiconductor, and which can detect the location of a spot of light on the light-receiving face.

In addition, the scanning probe microscope is not limited to a contact-type atomic force microscope, a vibration-type atomic force microscope, and a scanning near field optical microscope, which have been described in the Preferred Embodiments. The invention includes all of an apparatus which uses a cantilever and a probe, and controls the distance between the probe and a sample while detecting their displacement and vibrational amplitude, and pieces of hardware which detect a force applied to a probe and an interaction thereby to measure a physical property of a sample surface. Also, the invention includes all pieces of hardware which use a probe to perform the processing of a sample surface, and to manipulate a substance on a sample surface. An XY scanner does not have to be used to perform scan. The invention includes pieces of hardware which have only the function of detecting an interaction in a direction of the height by use of a Z micro-moving mechanism.

Further, an optical displacement-detecting mechanism in accordance with the invention is not limited to the application to a scanning probe microscope. For example, the optical displacement-detecting mechanism is applicable to surface information measuring apparatuses including a surface roughness tester which incorporates an optical displacement-detecting mechanism, and an electrochemical microscope, and a probe processing apparatus which uses a probe to perform the processing of a sample surface. As for these apparatuses, the noise percentage with respect to the detection sensitivity can be reduced by application of an optical displacement-detecting mechanism in accordance with the invention, and thus the accuracy of measurement of the apparatuses is improved.

What is claimed is:

1. An optical displacement-detecting mechanism, comprising:
    a light source for irradiating a target for measurement with light;
    a light source-driving circuit for driving the light source;
    an optical detector for receiving light after the irradiation of the target for measurement by the light source and converting the light into an electric signal thereby to detect an intensity of light;
    a current-voltage conversion circuit for processing a detection signal of the optical detector with a predetermined amplification factor, wherein when intensity spectra of the light source are measured with respect to a wavelength, a half width of the spectrum having a maximum intensity is not less than 10 nm, and the light source is driven with an output power of not less than 2 mW; and
    an optical member with a reflecting surface of an arbitrary reflectance having a polarization dependence on an optical path from the light source through the target for measurement to the optical detector, wherein the light source has polarization dependence, and the light source and optical member are disposed so that the reflectance of the optical member becomes higher.

2. The optical displacement-detecting mechanism in accordance with claim 1, wherein the half width of the spectrum of the light source is not more than 25 nm.

3. The optical displacement-detecting mechanism in accordance with claim 1, wherein the optical detector has a light-receiving face divided into four or two,
    the target for measurement is irradiated with light from the light source, and
    the light-receiving face receives light reflected by the target for measurement.

4. The optical displacement-detecting mechanism in accordance with claim 1, wherein the optical detector has a light-receiving face divided into four or two,
    the target for measurement is irradiated with light from the light source, and
    a shadow of the target for measurement is projected on the light-receiving face of the optical detector.

5. The optical displacement-detecting mechanism in accordance with claim 1, wherein a super luminescence diode (SLD) is used for the light source.

6. The optical displacement-detecting mechanism in accordance with claim 1, wherein the arbitrary reflectance of the reflecting surface has a wavelength dependence on an optical path from the light source through the target for measurement to the optical detector.

7. The optical displacement-detecting mechanism in accordance with claim 1, wherein a wavelength of the light source is not less than 700 nm, and
    a reflecting member coated with gold or gold alloy is disposed on an optical path from the light source through the target for measurement to the optical detector.

8. The optical displacement-detecting mechanism in accordance with claim 1, wherein the target for measurement is a cantilever, and
    coats identical with each other in material and thickness are applied to two opposing faces of the cantilever.

9. The optical displacement-detecting mechanism in accordance with claim 1, wherein light from the light source is transmitted through an optical fiber, and
    then the target for measurement is irradiated with the light.

10. A probe microscope, comprising:
    an optical displacement-detecting mechanism in accordance with claim 1, in which the target for measurement is one of a cantilever having a probe on its leading end and a probe of an arbitrary form;
    a sample holder for holding a sample;
    a holder for holding the one of the cantilever and probe;
    moving means composed of a micro-moving mechanism for relatively moving the one of the cantilever and probe, and the sample holder at least in Z direction perpendicular to a sample surface; and
    control means for controlling the moving means based on a result of detection by the optical displacement-detecting mechanism and collecting observation data of the sample,
    wherein the micro-moving mechanism is one of uniaxial and multiaxial micro-moving mechanisms.

11. The probe microscope in accordance with claim 10, wherein the one of the cantilever and probe is driven in a liquid solution.

12. The probe microscope in accordance with claim 11, further comprising:
    an optically transmissive base having an arbitrary transmittance with respect to light emitted by the light source in an optical path between the light source and the one of the cantilever and probe as the target for measurement,
    wherein a liquid solution is filled in a space between the base and the target for measurement so that boundaries of the liquid solution are in contact with boundaries of the base and target for measurement, and
    the one of the cantilever and probe is disposed in the liquid solution.

13. A surface information measuring apparatus, comprising an optical displacement-detecting mechanism in accordance with claim 1,
    wherein a measurement on surface information of a sample is made by detection of positional information of a probe as the target for measurement, and the optical displacement-detecting mechanism is used to perform the detection of positional information of the probe.

* * * * *